Nov. 27, 1945.  J. V. WALKER  2,390,034
STUD SETTING DEVICE
Filed Dec. 22, 1941  2 Sheets-Sheet 2
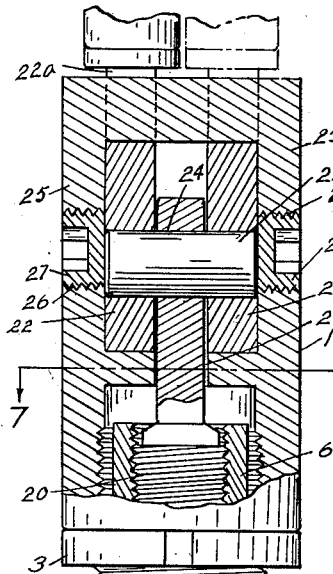
Fig. 5.
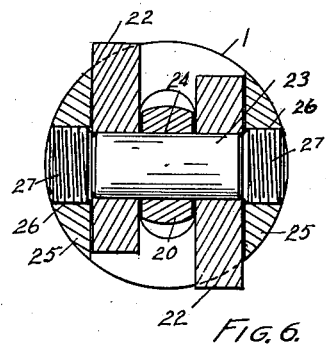
Fig. 6.
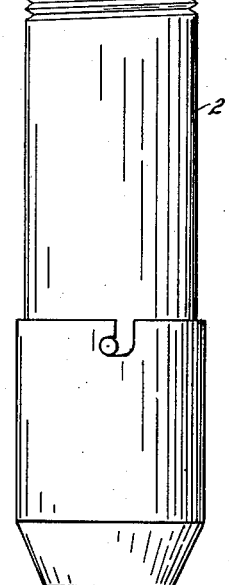
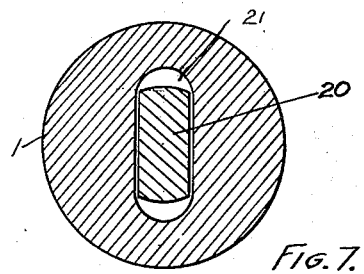
Fig. 7.
Fig. 8.
John Vincent Walker
INVENTOR
BY
ATTORNEYS Patented Nov. 27, 1945

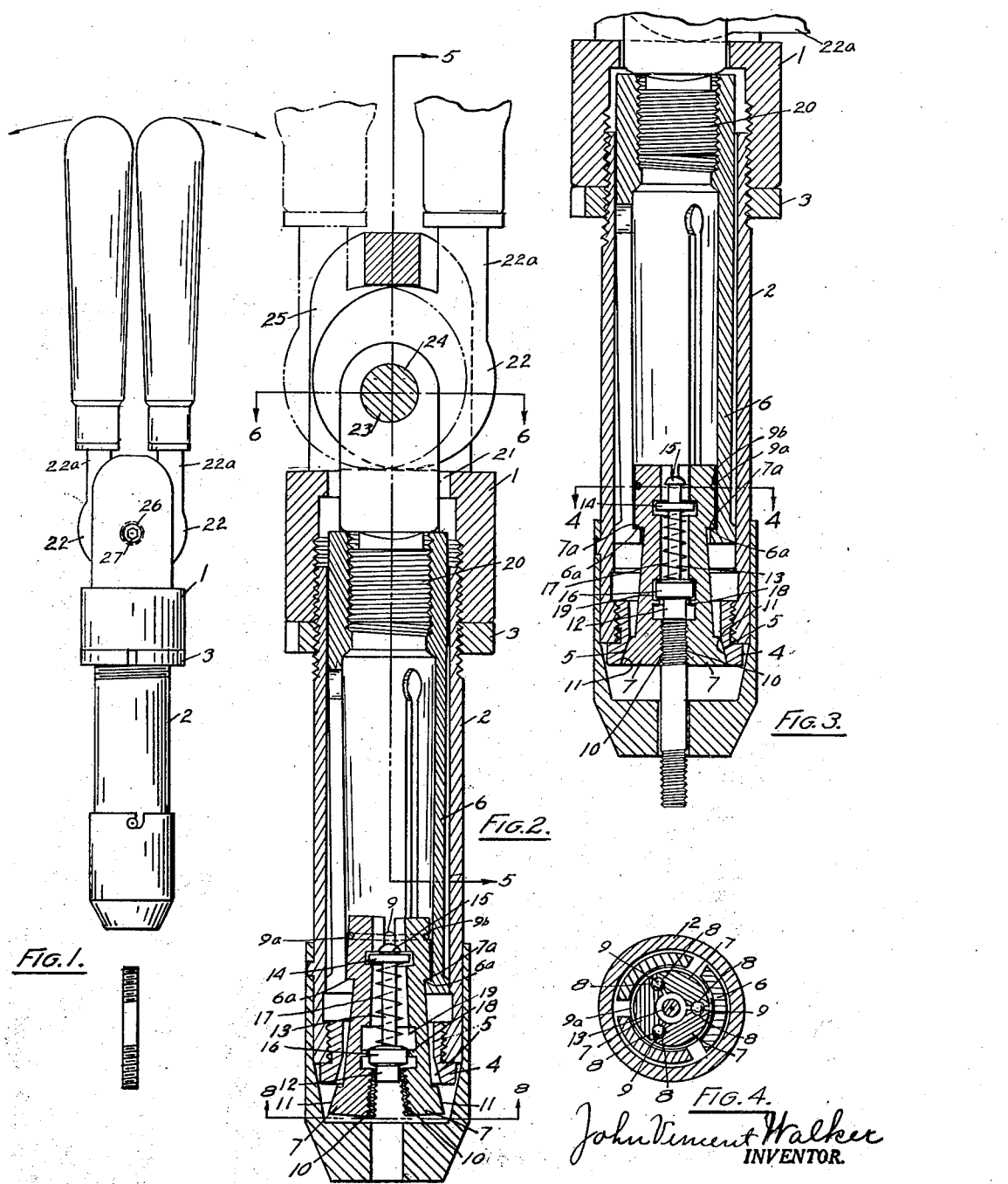

2,390,034

UNITED STATES PATENT OFFICE 2,390,034

STUD SETTING DEVICE

John Vincent Walker, Fairview, Pa., assignor to Titan Tool Company, Fairview, Pa., a corporation of Pennsylvania Application December 22, 1941, Serial No. 423,983

4 Claims. (Cl. 81—112)

The present invention is designed for driving studs. More common practice in driving studs is to provide jaws which may be closed on the thread and provide the driving engagement between the stud and the setting device by limiting the screwing movement of the thread in the jaws. The present invention is designed to close the jaws on the thread with a clamping force sufficient to drive the stud and to provide sufficient clearance in opening so that the stud may be moved axially to place and discharged without any turning movement. This clamping of the thread as distinguished from the driving fit, is less apt to injure the threads on the stud.

The invention also contemplates a convenient mechanism for actuating the jaws and turning the setting device for setting the stud.

Features and details of the invention will appear from the specification and claims.

A preferred embodiment of the invention is illustrated in the accompanying drawings, as follows:

Fig. 1 shows a side elevation of the tool with the parts in open position.

Fig. 2 a similar view showing a central longitudinal section with the jaws in open position.

Fig. 3 a similar view with the jaws in closed position.

Fig. 4 a section on the line 4—4 in Fig. 3.

Fig. 5 shows the device in elevation, the upper part being broken away to better show construction, in section on the line 5—5 in Fig. 2.

Fig. 6 a section on the line 6—6 in Fig. 2.

Fig. 7 a section on the line 7—7 in Fig. 5.

Fig. 8 a section on the line 8—8 in Fig. 2.

1 marks a head of the device. This has an extending sleeve 2 which is screwed into the head 1 and locked by a lock nut 3. The lower end of the sleeve 2 has a thread which receives a screw-threaded closing sleeve 4, the closing sleeve 4 having out-of-round surfaces 5, preferably hexagonal, for closing and driving the jaws.

A sleeve 6 is arranged within the sleeve 2 and adapted to move axially relatively to the sleeve 2. The jaws 7 are carried by the sleeve 2, the jaws having a shoulder 7a engaging an internal shoulder 6a on the sleeve. There are preferably three jaws having ball sockets 8 on opposing surfaces in which are arranged the balls 9. The balls permit a swinging movement of the jaws for opening and closing, but maintain the axial relative position of the jaws with each other. A split sleeve 9a operating in a groove 9b in the jaws holds the jaws together on the balls but permits the swinging movement. The jaws have threads 10 adapted to conform to the threads of the stud being driven. The jaws have outer beveled surfaces 11 corresponding to the surfaces 5 so that when the jaws are drawn into the sleeve 4, the jaws are locked to turn with the sleeve 4 and consequently the head 1.

A stop pin 12 is arranged within the jaws. It is carried by a shank 13 extending through a washer 14. The upper end of the shank has a head 15 which retains the shank in the washer. The pin has a beveled head 16 and a spring 17 is arranged around the shank between the washer 14 and this head, the spring yieldingly pressing the head 16 downwardly so that the beveled surfaces engaging the walls of the jaw open the jaws.

When the device is placed on a stud, the stop pin 12 with its shank is moved upwardly until it reaches the limit of its upward movement as established by the walls of a socket 19 passing through the annular rib 18.

The jaws are forced together by a relative axial movement of the sleeves 2 and 6 with sufficient force to clamp the thread engaging surfaces 10 on the thread. This is accomplished without any turning of the device so that before there is any rotary movement of the device, there is a locking engagement between the device and the stud. Upon a return or release movement of the sleeves, the beveled surface of the head 12 acting on the rib 18, cams the jaws to open position. This open position is sufficiently open to permit the direct axial removal of the stud setting device.

The upper end of the sleeve 2 is screwed onto an extension 20 which has a flat-sided upper end that extends through an opening 21 in the head 1. Cams 22 are arranged at each side of the flat portion of the extension 20 and are journaled on a pin 23 which extends through an opening 24 in the extension. These cams are retained in place by the side walls 25 of the head 1. Openings 26 are provided by means of which the pin 23 may be assembled in position. The openings 26 are closed by plugs 27.

Handles 22a extend from the cams. These handles are offset slightly from a radial direction from the pin so that when they are in upper position the handles are parallel with each other, as clearly shown in Fig. 1. The handles are related to the cams so that when the handles are swung down to cross position, the cams have operated to move the sleeves 2 and 6 relatively to each other sufficiently to close the jaws on an inserted stud and clamp the same on the stud.

The cams with the lever handles provide a very powerful clamping means and the handles as they are swung down to cross position, afford a means by which the setting device may be rotated to drive the stud.

What I claim as new is:

1. In a stud setting device, the combination of clamping jaws, a mounting for the jaws comprising relatively axially movable members, one carrying the jaws and the other having closing surfaces acting on the jaws, the jaws being mounted for sliding inward against said closing surfaces, a stop carried by the jaws engageable by the end of the stud to locate the stud and to move the jaws inward against the closing surfaces, and means in addition to the pressure of the stud on the stop for relatively moving the members to clamp the jaws in driving engagement with the stud.

2. In a stud setting device, the combination of clamping jaws, a mounting for the jaws comprising relatively axially movable members, one carrying the jaws and the other having closing surfaces acting on the jaws, the jaws being axially slidable inward in the jaw carrying member, stop means carried by the jaws engaging an inserted stud and moving the jaws inward relative to the members into initial gripping position as the stud is inserted, and additional means reacting between said members to move the members to clamp the jaws in driving engagement with the inserted stud.

3. In a stud setting device, the combination of clamping jaws, a mounting for the jaws comprising relatively axially movable members, one carrying the jaws and the other having closing surfaces acting on the jaws, the jaws being mounted for sliding inward against said closing surfaces, a stop carried by the jaws engageable by the end of the stud to locate the stud and to move the jaws inward against the closing surfaces, and means in addition to the pressure of the stud on the stop for camming the jaws inward against the closing surfaces to clamp the jaws in driving engagement with the stud.

4. In a stud setting device, the combination of clamping jaws, a mounting for the jaws comprising relatively axially movable members, one carrying the jaws and the other having closing surfaces acting on the jaws, means moving the sleeves to open and close the jaws, the closing movement clamping the jaws in driving engagement with the inserted stud, and a pair of oppositely placed levers actuating the means, said levers swinging on axes at right angles to a plane through the axis of the mounting, said levers when in set position extending in crosswise directions from the axis of the mounting and forming oppositely disposed levers for rotating the stud setting device, said levers swinging to a position approximating an axial direction and adjacent to the axis of the mounting with the opening of the stud setting device.

JOHN VINCENT WALKER.